(12) United States Patent
Shilane et al.

(10) Patent No.: US 9,798,754 B1
(45) Date of Patent: Oct. 24, 2017

(54) METHOD TO EFFICIENTLY TRACK I/O ACCESS HISTORY USING EFFICIENT MEMORY DATA STRUCTURES

(71) Applicant: EMC Corporation, Hopkinton, MA (US)

(72) Inventors: Philip Shilane, Yardley, PA (US); Grant Wallace, Pennington, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 351 days.

(21) Appl. No.: 14/303,427

(22) Filed: Jun. 12, 2014

(51) Int. Cl.
*G06F 17/30* (2006.01)

(52) U.S. Cl.
CPC ............... *G06F 17/30324* (2013.01)

(58) Field of Classification Search
CPC .................................. G06F 17/30324
USPC ............................................. 707/745
See application file for complete search history.

(56) References Cited

U.S. PATENT DOCUMENTS

| | | | |
|---|---|---|---|
| 9,229,657 B1 * | 1/2016 | Rus ............... | G06F 3/0643 |
| 2006/0271740 A1 * | 11/2006 | Mark ............... | G06F 3/0611 |
| | | | 711/137 |
| 2010/0280996 A1 | 11/2010 | Gross, IV et al. | |
| 2010/0332401 A1 * | 12/2010 | Prahlad ............ | G06F 17/3002 |
| | | | 705/80 |
| 2014/0006465 A1 * | 1/2014 | Davis ............... | G06F 17/30194 |
| | | | 707/827 |
| 2014/0095438 A1 * | 4/2014 | Marwah ............ | G06F 17/30073 |
| | | | 707/639 |
| 2014/0149357 A1 * | 5/2014 | Gupta ............... | G06F 17/30008 |
| | | | 707/652 |
| 2014/0250281 A1 | 9/2014 | Rao et al. | |
| 2015/0039837 A1 * | 2/2015 | Quan ............... | G06F 3/061 |
| | | | 711/136 |

OTHER PUBLICATIONS

U.S. Appl. No. 14/303,418, Non-Final Office Action, Dated Sep. 28, 2016, 14 pages.

* cited by examiner

*Primary Examiner* — Rehana Perveen
*Assistant Examiner* — Hicham Skhoun
(74) *Attorney, Agent, or Firm* — Blakely, Sokoloff, Taylor & Zafman LLP

(57) ABSTRACT

An embodiment is described in which a memory device stores a record of I/O accesses to data blocks. And each access record indicates which data block was accessed and during which time period the access occurred. A memory-efficient data structure (MEDS) may be generated and stored in a cache or storage device and the access data moved from the memory device into the MEDS. The MEDS represents blocks that were accessed during a particular time period. When a second data block is accessed, a query function is applied to the second block's identifier to return a value based on data stored in the MEDS. The return value from the query function indicates whether the second data block was accessed during the particular time period associated with the MEDS. A storage management action is performed based on whether the second data block was accessed during the particular time period.

16 Claims, 17 Drawing Sheets

Pattern: File A, Blocks 8, 9, and 10 form a group of blocks that are accessed together Access History Log records sorted by [time, date, file handle, offset]

| | | |
|---|---|---|
| 8:00am | May 1, 2014 | File A | Block 10 |
| 10:00am | May 1, 2014 | File B | Block 1 |
| 10:00am | May 2, 2014 | File B | Block 1 |
| 10:00am | May 3, 2014 | File B | Block 1 |
| 10:00am | May 8, 2014 | File A | Block 1 |
| 11:00am | May 1, 2014 | File A | Block 9 |
| 11:01am | May 1, 2014 | File A | Block 8 |
| 11:02am | May 1, 2014 | File A | Block 10 |

710

Pattern: Everyday at 10:00am, File B, Block 1 is accessed

Fig. 7

Access History Log records sorted by [file handle, offset, date, time]

| | | | |
|---|---|---|---|
| File A | Block 1 | May 8, 2014 | 10:00am |
| File A | Block 8 | May 1, 2014 | 11:01am |
| File A | Block 9 | May 1, 2014 | 11:00am |
| File A | Block 10 | May 1, 2014 | 8:00am |
| File A | Block 10 | May 1, 2014 | 11:02am |
| File B | Block 1 | May 1 | 10:00am |
| File B | Block 1 | May 2 | 10:00am |
| File B | Block 1 | May 3 | 10:00am |

810

Pattern: Once File A, Block 10 is accessed at 8:00am, it is not accessed again for 3 hours.

Fig. 8

METHOD TO EFFICIENTLY TRACK I/O ACCESS HISTORY USING EFFICIENT MEMORY DATA STRUCTURES

CROSS-REFERENCE TO RELATED APPLICATIONS

This application is related to U.S. application Ser. No. 14/303,418 entitled "METHOD TO EFFICIENTLY TRACK I/O ACCESS HISTORY", filed Jun. 12, 2014, which is incorporated by reference herein in its entirety.

FIELD OF THE INVENTION

Embodiments of the present invention relate generally to data storage systems. More particularly, embodiments of the invention relate to tracking I/O access to optimize storage management decisions.

BACKGROUND

Analyzing historical I/O accesses to predict future system behavior may be prohibited by the volume of I/O accesses in a computer system. The overhead in processing time added to every I/O to log the data and the amount of space needed to store the access data may be prohibitively expensive. As an example, a 96 TB storage system with 8 KB blocks has 12 billion blocks. Even supposing that 10% are regularly accessed, that is 1.2 billion blocks to track. Tracking access patterns to billions of blocks can easily consume GB of memory and/or billions of disk accesses.

For that reason, most systems do not log I/O accesses at all. Others may log at a coarser granularity, recording representative samples of access. Still other may log only a limited time horizon of history such as a few hours, or tracking access to very large block sizes. However, short term or coarse-grained access histories may not enable the discovery of important access patterns that may be useful for predicting future system behavior.

A technical challenge to using historical access data to make more efficient cache and storage management decisions is how to maintain a detailed history of I/O accesses given limited memory and I/O availability without adversely impacting the performance of the system. The process that tracks I/O patterns may not interfere with client storage accesses. A solution is needed that requires minimal resources.

BRIEF DESCRIPTION OF THE DRAWINGS

Embodiments of the invention are illustrated by way of example and not limitation in the figures of the accompanying drawings in which like references indicate similar elements.

FIG. 7 is an example I/O access history sorted to discover a pattern of access, according to an embodiment of the invention.

FIG. 8 is an example I/O access history sorted to discover a pattern of access, according to an embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A process is defined herein for observing and recording long term data access patterns on which to base improved decisions about which blocks to put into a cache or store in a faster storage layer, which blocks to evict, and which blocks to pre-fetch from a slower storage layer. A high level process may be used for recording I/O access, looking for patterns of access in the records, and storing recognized patterns in a database, according to an embodiment of the invention.

Figure 1:
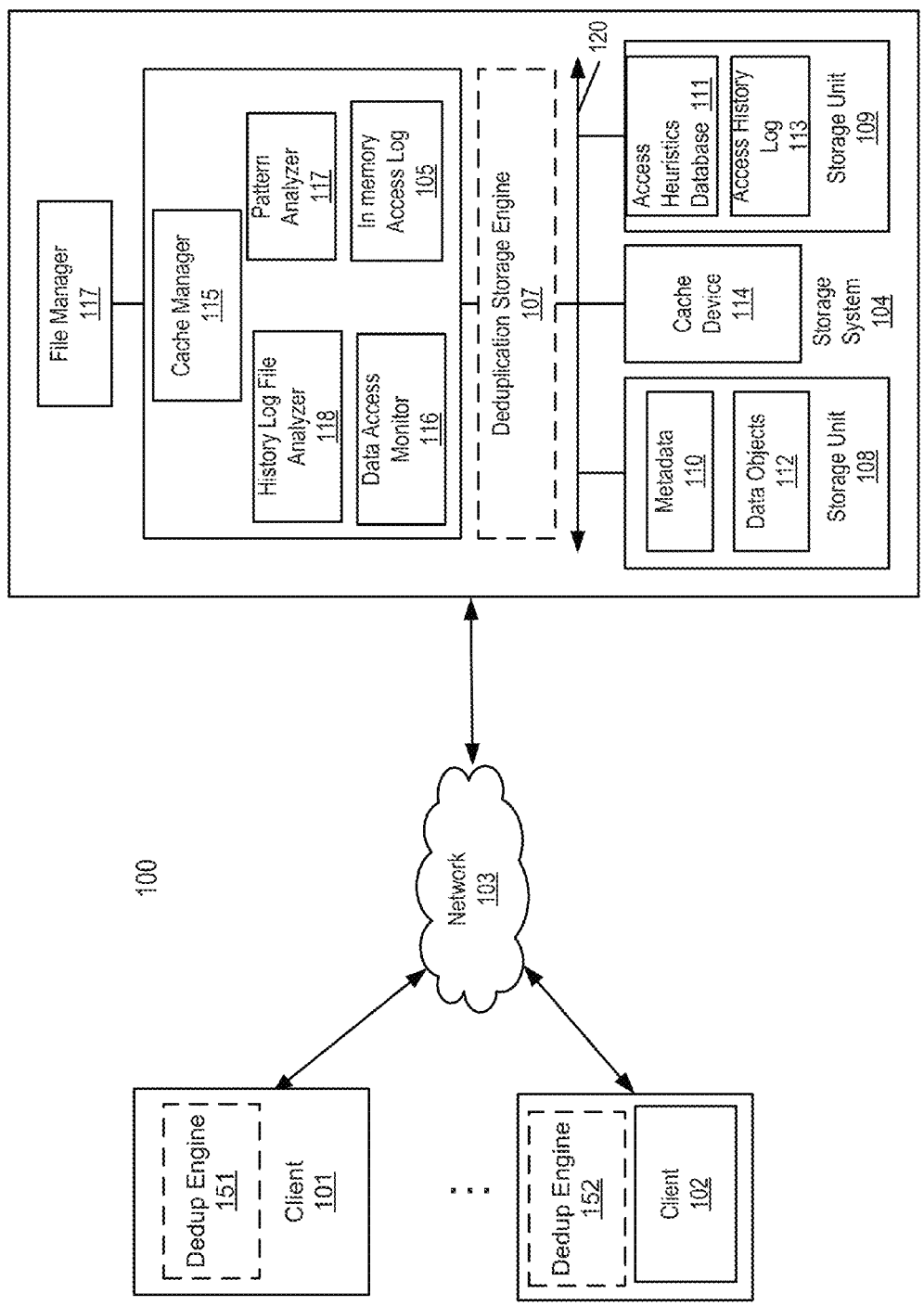
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more Client Systems 101-102 communicatively coupled to Storage System 104 over Network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of Clients 101-102 may be a primary storage system that provides storage to other local clients, which may periodically back up the content stored therein to a backup storage system, such as Storage System 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage System 104 may be located in proximity to one, both, or neither of Clients 101-102.

Storage System 104 may include any type of server or cluster of servers. For example, Storage System 104 may be a storage server used for any of various different purposes, such as to provide multiple users with access to shared data and/or to back up data (e.g., mission critical data). The Storage System 104 also may include Deduplication Storage Engine 107, and one or more Storage Units 108-109 communicatively coupled to each other. Storage Units 108-109 may be implemented locally (e.g., single node operating environment) or remotely (e.g., multi-node operating environment) via Interconnect 120, which may be a bus and/or a network (e.g., a storage network or a network similar to Network 103). Storage Units 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In response to a data file to be stored in storage Units 108-109, Deduplication Storage Engine 107 is configured to segment the data file into multiple chunks (also referred to as segments) according to a variety of segmentation policies or rules. Deduplication Storage Engine 107 may choose not to store a chunk in a storage unit if the chunk has been previously stored in the storage unit. In the event that Deduplication Storage Engine 107 chooses not to store the chunk in the storage unit, it stores metadata enabling the reconstruction of the file using the previously stored chunk. As a result, chunks of data files are stored in a deduplicated manner, either within each of storage Units 108-109 or across at least some of storage Units 108-109. The metadata, such as Metadata 110, may be stored in at least some of storage Units 108-109, such that files can be accessed independent of another storage unit. Metadata of each storage unit includes enough information to provide access to the files it contains.

In one embodiment, any of clients 101-102 may further include an optional deduplication engine (e.g., deduplication engines 151-152) having at least a portion of functionalities of deduplication Engine 107. Deduplication engines 151-152 are configured to perform local deduplication operations, respectively. For example, prior to transmit data to Storage System 104, each of the deduplication engines 151-152 may deduplicate the data into deduplicated segments and determine whether a particular deduplicated segment has been stored in Storage System 104. A deduplicated segment is transmitted to Storage System 104 only if it has not been stored in Storage System 104.

For example, when Client 101 is about to transmit a data stream (e.g., a file or a directory of one or more files) to Storage System 104, Deduplication Engine 151 is configured to deduplicate the data stream into deduplicated segments. For each of the deduplicated segments, Client 101 transmits a fingerprint of the deduplicated segment to Storage System 104 to determine whether that particular deduplicated segment has already been stored in Storage System 104. A deduplicated segment that has been stored in Storage System 104 may be previously received from the same Client 101 or from another client such as Client 102. In response to a response from Storage System 104 indicating that the segment has not been stored in Storage System 104, that particular segment is then transmitted over to the Storage System 104. As a result, the network traffic and the processing resources required can be greatly reduced.

According to one aspect of the invention, as client I/Os take place, a history may be maintained in a sequentially written journal. Each I/O may be represented by a record including a file handle, offset, timestamp, and other properties. Alternatively, a fingerprint (i.e. a secure hash algorithm (SHA)-1 hash of the content) may be recorded instead of a file handle and offset combination. A buffer of I/O log records may be stored in memory, and when the buffer becomes full, the buffer may be appended to the history log. The history log may actually include multiple files, where an active file is closed and a new file is created based on various properties: file size, end of day or week, etc. Writing sequentially is generally a low-overhead procedure because of the nature of hard drives.

In an offline process, the access history log stored in the storage system may be sorted in various ways in order to detect patterns of data access over time. The offline process may be performed during periods when the storage system has low client demands. Sorting the log may be performed such that records for the same file handle/offset or fingerprints will appear together after sorting, with a secondary sorting by time for entries having a common file ID. The log may be scanned to determine which accesses have a periodic nature, meaning they are consistently accessed hourly, daily, weekly, etc. Hourly access may be defined in a number of different ways. For example, hourly access could be defined as accessed at least once each hour for X hours in our period of analysis, where as an example, X might be 20 of 24 hours. Similarly, Daily Access may be defined as accessed at least once each day for X days per week (X=6 of 7). Once the block is determined to be accessed in a periodic manner (e.g. hourly or daily), a new record may be created and inserted into a database.

There are numerous properties that may be useful for making caching decisions. As a first example, the number of times a block is accessed during a particular time period could be recorded. When that block is cached, the block may be associated with the count of access times. When the block is accessed in a cache, the expected access count may be decremented, and when the count reaches zero, the block may be evicted from the cache because no further access is expected. As a second example, if a block is observed to be accessed about every 3 hours, that information could be used to decide to evict the block after 3.1 hours without waiting for the block to age out of the cache as a naïve caching algorithm such as least-recently-used would implement.

Other properties that could be maintained with the access record include distinguishing between read and write accesses, random versus sequential I/O patterns (useful for prefetching), and whether the access took place in memory, solid state device (SSD), or hard disk drive (HDD), or other storage layers. To reduce resource overheads for a database, for example, blocks larger than 8 KB may be tracked such as using a 1 MB extent that spans consecutive tracked blocks. The restrictiveness of our criteria for determining that an access pattern is periodic may be increased, such as defining that an hourly access threshold is 24 of 24 hours instead of a weaker threshold of 20 of 24 hours. As another embodiment, a consecutive access pattern might have to be larger than a threshold number of bytes (such as 10 MB) before it is added to a database tracking consecutive patterns. As a further embodiment, a block may have to be accessed more than a threshold number of times (such as 5) before it is added to a database that tracks frequently accessed blocks. Thus, each pattern may be created based on the information in many log records, and each log record may be represented in one or more patterns, or in no pattern. Thus, the size of data needed to represent a pattern may be less than the amount of I/O access history log from which the patterns are discovered.

Referring again to FIG. 1, in response to a File Manager 117 request to write or read a block of data to/from storage, a Data Access Monitor 116 stores a record of the access in an In-memory Access Log 105. As in-memory buffers storing the In-memory Access Log 105 become full, the log may be written to an Access History Log 113 or other data structure for storing access information persistently. A History Log File Analyzer 118 may analyze the logged access data by, for example, sorting the log entries by different attributes and grouping together records that are related by one of the logged data fields. A Pattern Analyzer 117 may generate a record in an Access Heuristics Database 111 for storing a pattern observed from the groups of records. Cache Manager 115 or Storage System 104 may query the Access Heuristics Database 111 to determine if there is a pattern of access for a particular block, and decide whether to cache, store in a fast storage tier, evict from the cache and/or how and where to store the particular block based on a discovered access pattern.

Figure 2:
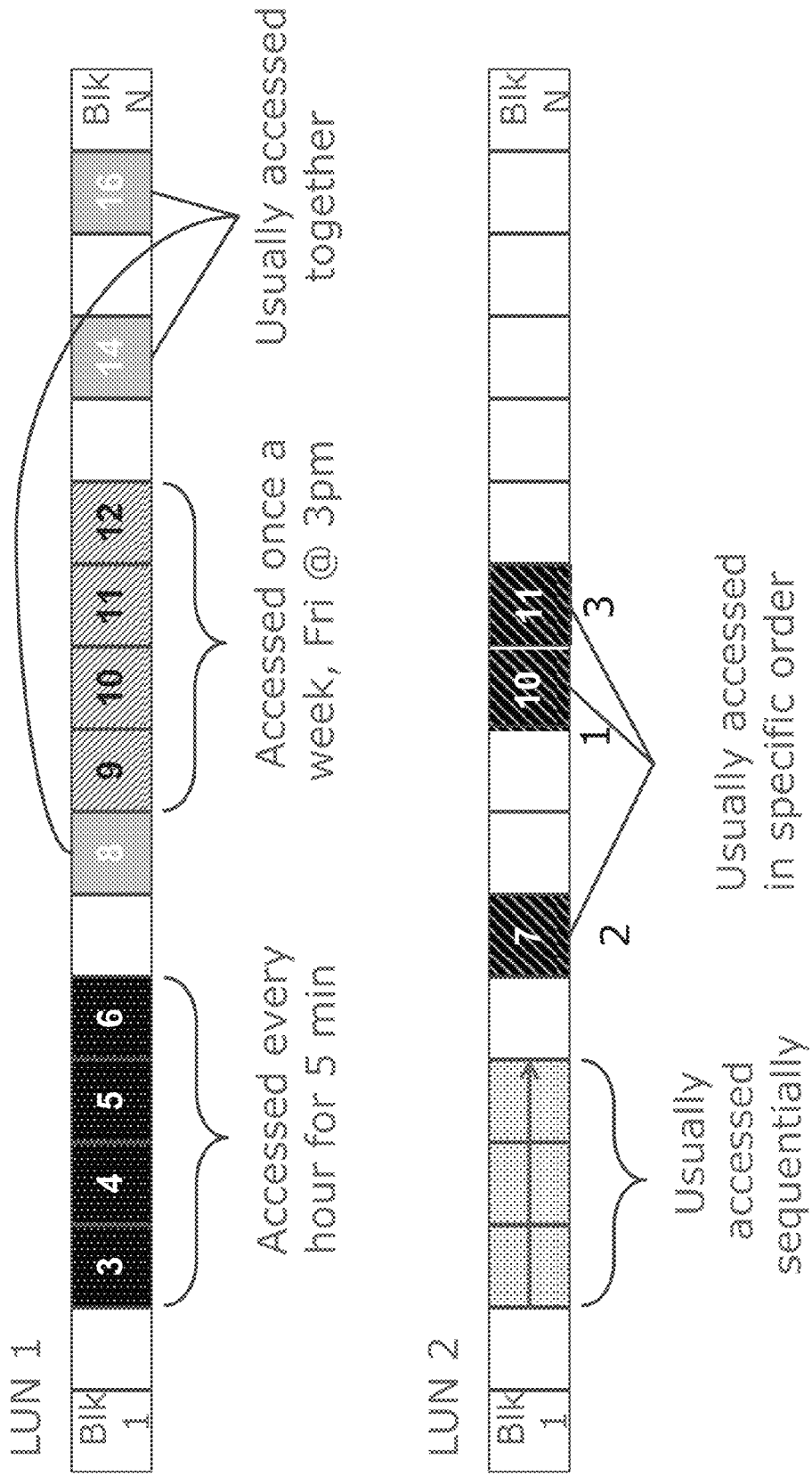
FIG. 2 illustrates several patterns that may be recognized from an access log, according to an embodiment of the invention.

FIG. 2 illustrates several patterns that may be recognized from an access log, according to an embodiment of the invention. Three patterns are illustrated on logical unit (LUN) 1. For example, one pattern may be that blocks 3-6 are accessed consecutively every hour for 5 minutes. Observing that pattern may lead to a storage system keeping blocks 3-6 in memory for at least 5 minutes, and/or pre-fetching blocks 4-6 when block 3 is accessed. Even though blocks 4-6 may be pre-fetched, they might not be stored in the cache if previous access patterns indicate that these blocks are not likely to be used again for another hour. Another pattern illustrated in LUN 1 is that blocks 8, 14, and 16 are accessed together (within a short time from each other), and blocks 9-12 are accessed once a week on Friday at 3:00. Patterns illustrated on LUN 2 include blocks 3-5 being accessed sequentially and blocks 7, 10, 11 are usually accessed in the following order: 10, 7, 11.

Figure 3:
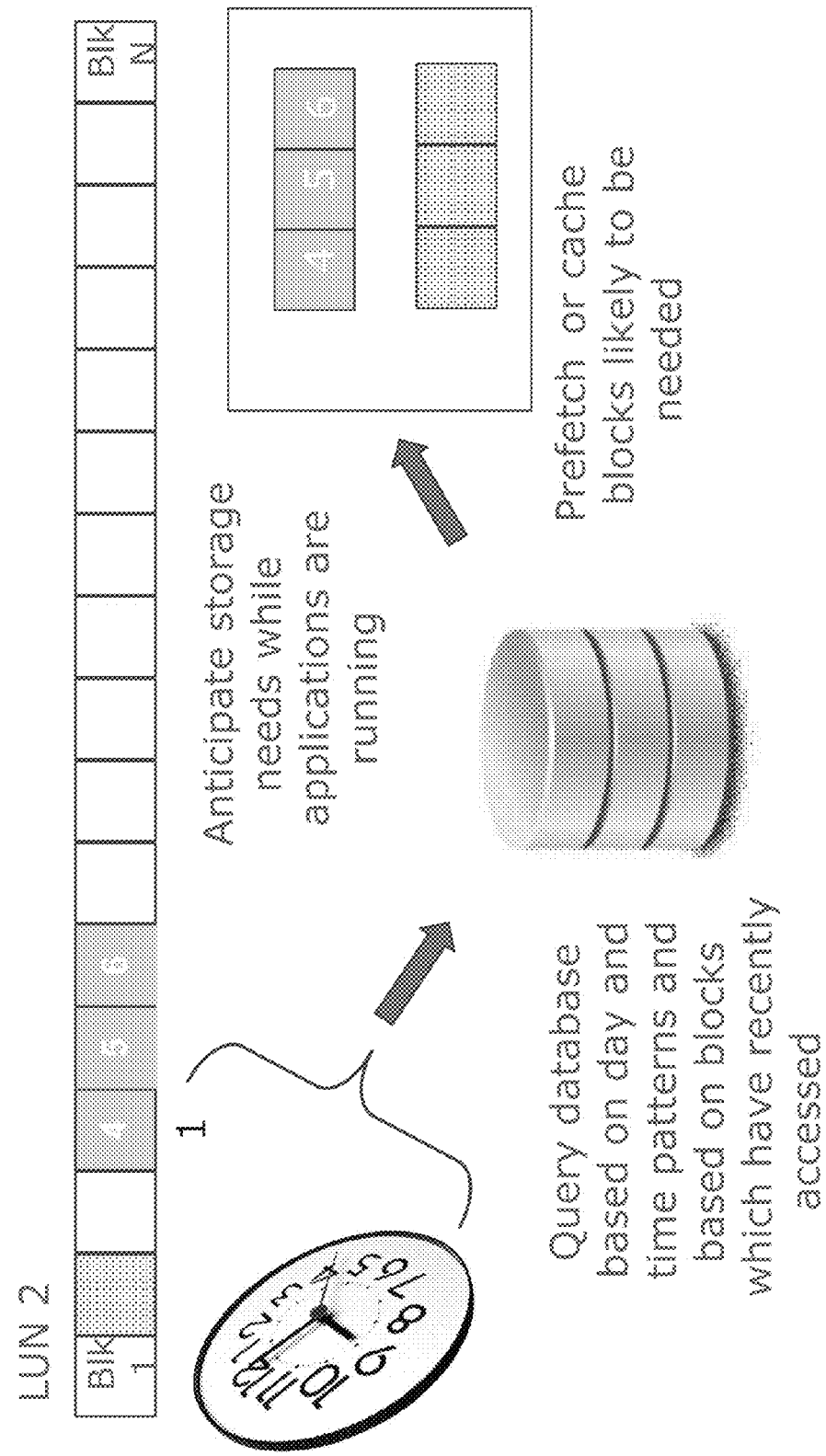
FIG. 3 illustrates using access patterns stored in a database for aiding in storage management decisions, according to an embodiment of the invention.

FIG. 3 illustrates using access patterns stored in a database for aiding in storage management decisions, according to an embodiment of the invention. Several events may trigger a query of the database for access patterns. For example, if a cache manager (e.g., Cache Manager 115 of FIG. 1) selects a block to evict based on a policy such as least recently used, the cache manager may query the database (which may be part of Access Heuristics Database 111 of FIG. 1) for patterns that indicate when this block is likely to be used again. If the block is expected to be accessed soon, the cache manager may select a different block to evict. Similarly, upon receiving an access request for a particular block, the cache manager may query the access pattern database for other blocks that are expected to be accessed soon after the particular block is accessed, and pre-fetch those pages. Another type of trigger may be a time of day trigger. During idle system cycles, a cache manager may query the access database for patterns that occur at that time of day on that day of the week and proactively pre-fetch or reorganize the storage of those pages. The illustration in FIG. 3 shows block 4 being accessed, the database being searched for an access pattern including block 4, finding a pattern that indicates blocks 5 and 6 are likely to be accessed sequentially, and proactively pre-fetching blocks 5 and 6.

Figure 4:
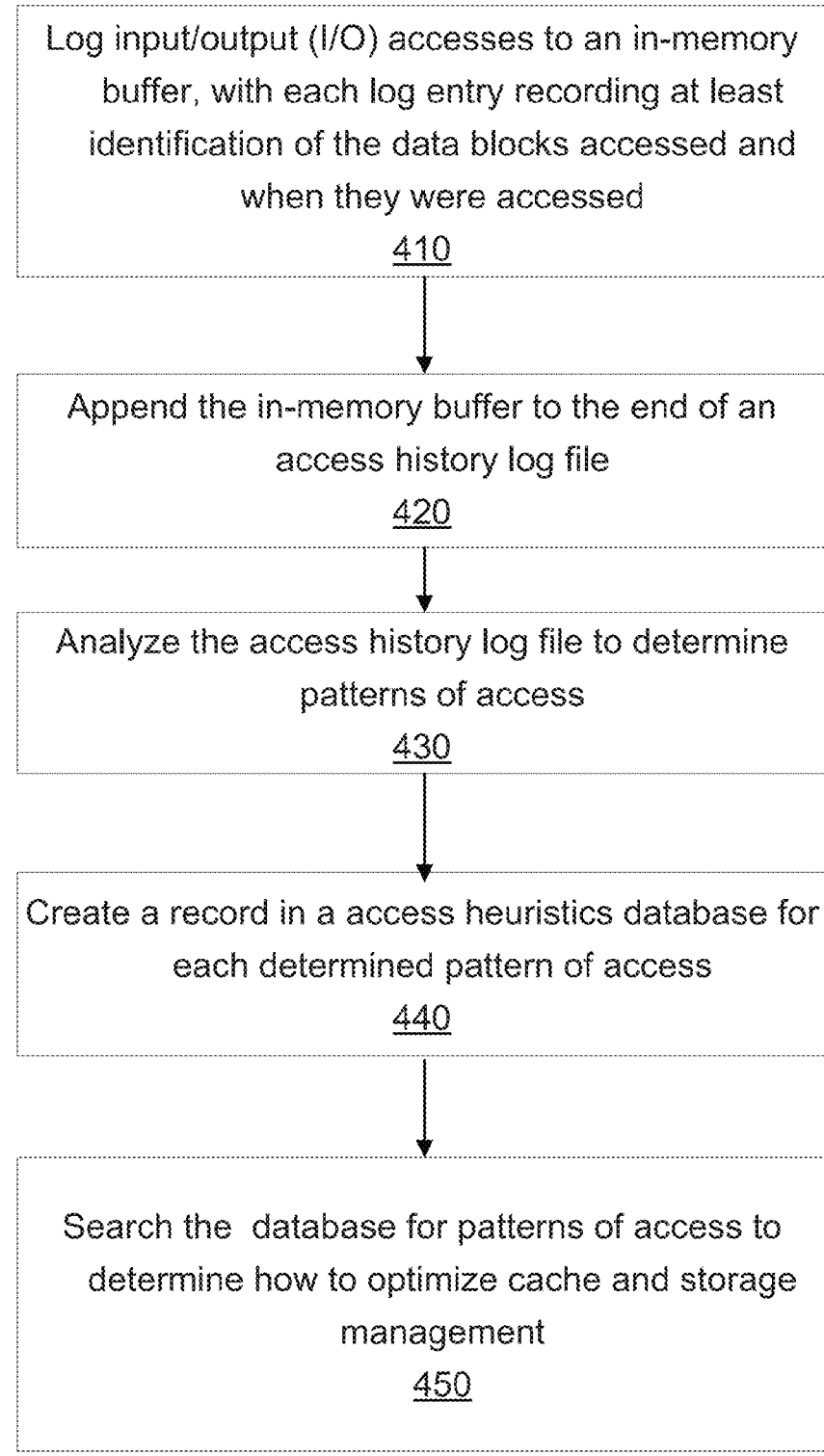
FIG. 4 is a flow diagram showing a process for using access patterns to inform storage management decisions, according to an embodiment of the invention.

FIG. 4 is a flow diagram showing a method for using access patterns to inform storage management decisions, according to an embodiment of the invention. The operations of the flow diagram are further illustrated in FIG. 5, which is a block diagram illustrating the interaction of components for discovering and using access patterns for storage management decisions. The method as shown in FIG. 4 may be performed by processing logic, which may include software, hardware, or a combination thereof.

The first portion of the flow is the recording and analysis of I/O accesses. File Manager 117 may access a block of storage. In Block 410, I/O accesses are logged to an in-memory buffer, with each log entry recording at least identification of the data blocks accessed and when they were accessed. Data Access Monitor 116 captures information about a data access such as the block identifier and the time of access and appends a record of the access to the Access History Log 113. A block identifier that is a logical block address relative to a file is used for explanatory purposes herein, but other identifiers are possible such as a secure hash of the block or a physical address.

In Operation 420, the access record may be added to a memory-resident buffer, which when full, may be appended to the Access History Log 113 in persistent storage. The records may be written sequentially in chronological order.

In Operation 430, Pattern Analyzer 118 may analyze the Access History Log 113 to discover patterns of access. For example, Pattern Analyzer 118 may sort the log based on different pieces of information in the log and discover accesses that are clustered around the common values. For example, the log may be first sorted by a file ID to cluster access records for each file, then sort within each file chronologically. This may reveal the relative timing of accessing blocks within a file such as blocks accessed consecutively, together, or repeatedly. Another example is a non-consecutive pattern of access that is itself repeated. Another example is that records may be sorted by time of day across many days that may be used to find patterns of block access at the same time every day. Yet another example is that records may be sorted by days of the week to find patterns of blocks accessed on a particular day of the week.

In Operation 440, the Pattern Analyzer 118 may create a record of an observed access pattern to store in an Access Heuristic Database 111. Thus, the cluster of access records that lead to the observation of an access pattern are stored condensed within less space than the space occupied by the raw access records. This reduces the size of the access heuristic data base 111.

Figure 5:
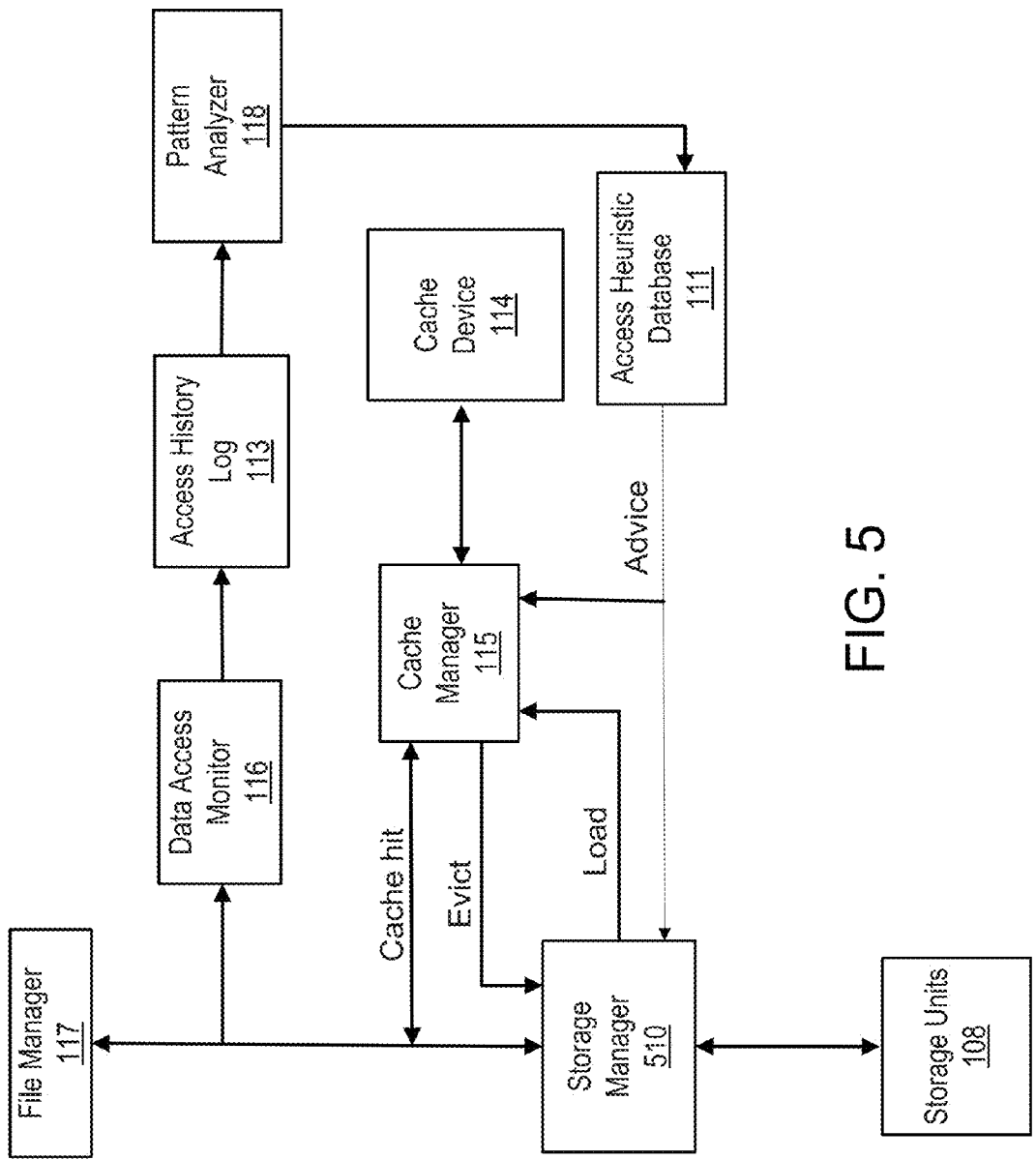
FIG. 5 is a block diagram illustrating the flow of data through the I/O system.

The second portion of the flow illustrated in FIG. 5 is the flow associated with responding to a request for access and illustrates how the patterns stored in the Access Heuristic Database 111 may be used to optimize storage management decisions. Cache Manager 115 may determine whether the block requested by the File Manager 117 is stored within Cache Device 114. If so, the cached block may be accessed according to the request. If the requested block is not cached, then Storage Manager 510 may retrieve the block from Storage Units 108. The Storage Manager 510 may load the requested block into the cache. Cache Manager 115, upon receiving a new block to cache, may be required to evict a block currently in the cache to make room for the new block.

In Operation 450, the Access Heuristic Database may be queried to retrieve time-based or identifier-based access patterns useful to determine which blocks should be cached and how blocks should be stored in Storage Units 108. The Cache Manager 115 may rely on patterns in the Access Heuristic Database 111 to determine whether additional blocks related to the new block should be pre-fetched, the new block should be cached, and whether a block that is nominated to be evicted should be evicted or whether it should stay in the cache because of a high probability of access in the near future. In an embodiment, the Storage Manager 510 may consult access patterns in the database before requesting to load a newly accessed block into the cache. Storage Manager 510 may further consult access patterns to determine how and where to store blocks on the Storage Units 108 based on blocks that are accessed consecutively.

Figure 6:
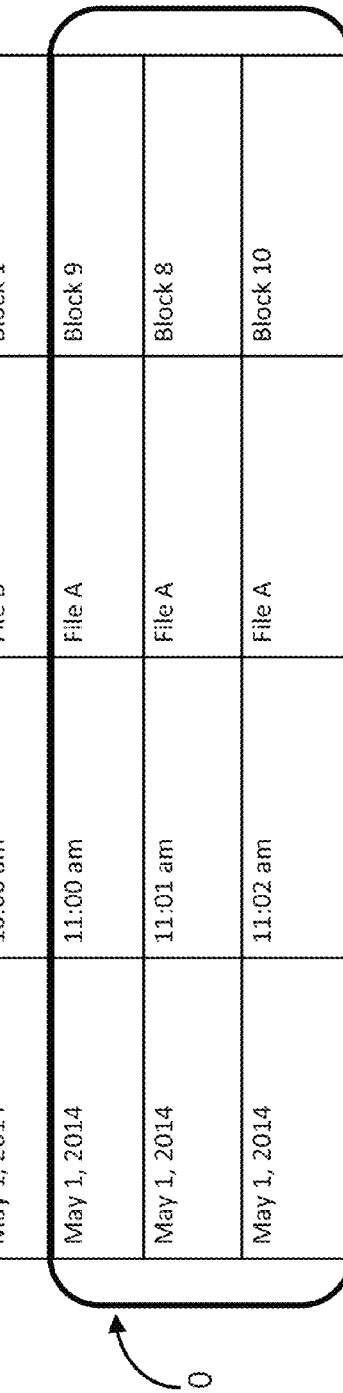
FIG. 6 is an example I/O access history sorted to discover a pattern of access, according to an embodiment of the invention.

FIG. 6 is an example I/O access history sorted to discover a pattern of access, according to an embodiment of the invention. Each row of the table shown in FIG. 6 represents an access record. In FIG. 6, the records are sorted by date, time, file handle, and offset. The grouping of three records, 610, represents a discovered pattern of access. On May 1, 2014, blocks 8, 9, and 10 of File A were accessed together at about 11:00 am.

FIG. 7 is an example I/O access history sorted to discover a different pattern of access, according to an embodiment of the invention. The records shown in FIG. 7 are sorted by time of day first, then date, then file ID and block number. The cluster of records 410 represents an access pattern that block 1 of File B is accessed every day at 10:00.

FIG. 8 is another example I/O access history sorted to discover a pattern of access, according to an embodiment of the invention. The records illustrated in FIG. 8 are sorted by File ID, block ID, date, and time. The pattern represented by grouping 810 of access records may indicate that once block 10 of File A is accessed, it is unlikely to be needed again for at least 3 hours, so block 10 may be a good candidate for cache eviction.

Efficient Real-Time Tracking

An even more concise way to record historical accesses to inform future storage management decisions is to maintain separate lists of blocks accessed during each of a number of time periods. For example, identification of all the blocks that are accessed at least once within an hour may be stored in association with that hour. Other time period durations may alternatively be used such as a 2 hour, 3 hour, or 1 day time window etc. In an embodiment of this more concise representation, the number of times accessed within the hour need not be recorded, and the exact time within the hour need not be recorded.

A memory-efficient data structure (MEDS) for tracking I/O access may be used to represent accesses during a particular time period (e.g. May 27, 2014 from 11:00 am to 12:00 pm) In an embodiment, a set of memory-efficient data structures may be used. For example, one data structure may be used while access is being recorded, and a different data structure may be used for storage and retrieval of access history. In addition, the size of a block for which access is tracked may be different than the size of a block for which historical access is provided. For example, access to every 4 KB-sized block may be tracked separately, but access history may only be provided for an aggregation of 4 KB-sized blocks (for example, 8 KB or 32 KB). When a request is received requesting access a data block, a value may be stored in a memory-resident data structure that represents the current time period to indicate which block was accessed. In an embodiment, the memory-resident data structure may include a bitmap in which each bit in the bitmap corresponds to a data block, and recording access to a data block comprises turning on the bit associated with the data block.

Subsequently, a data block may be read from storage, and the cache manager may consult a MEDSs corresponding to previous consecutive time periods to determine whether a newly read block should be cached. Another example is that a cache manager may elect a cache block to be evicted based on a least-recently used policy, but the cache manager may consult a MEDS corresponding to previous consecutive time periods to determine whether the elected block should be evicted or kept in memory.

A mapping function may be associated with the MEDS to map a data block identifier to a data element within the MEDS in which to record the indication of access. For example, if the MEDS includes a simple bitmap having a bit to represent a block or aggregation of blocks, a mapping function may convert a block byte address or offset to a bit position in the bit map, and the bit at that position may be turned on to record access.

In another embodiment, the MEDS may include a bloom filter. The bloom filter may also be represented as a bitmap with several associated functions. Rather than each bit representing a single data block, combinations of bits may represent the access status of a data block. For example, multiple mapping functions may be applied to a block identifier, and each mapping function may identify a distinct bit position. The multiple mapping functions may be constructed so that each distinct identifier is mapped to a distinct set of bit positions.

Whenever a block is accessed, all of the bits corresponding to positions identified by the multiple mapping functions may be turned on. Determining that a particular block has been accessed includes identifying the associated set of bit positions and verifying that all of the identified bits are turned on. Thus, each bit in the bitmap may be used in combination with other bits to determine previous access for more than one block identifier.

Figure 9:
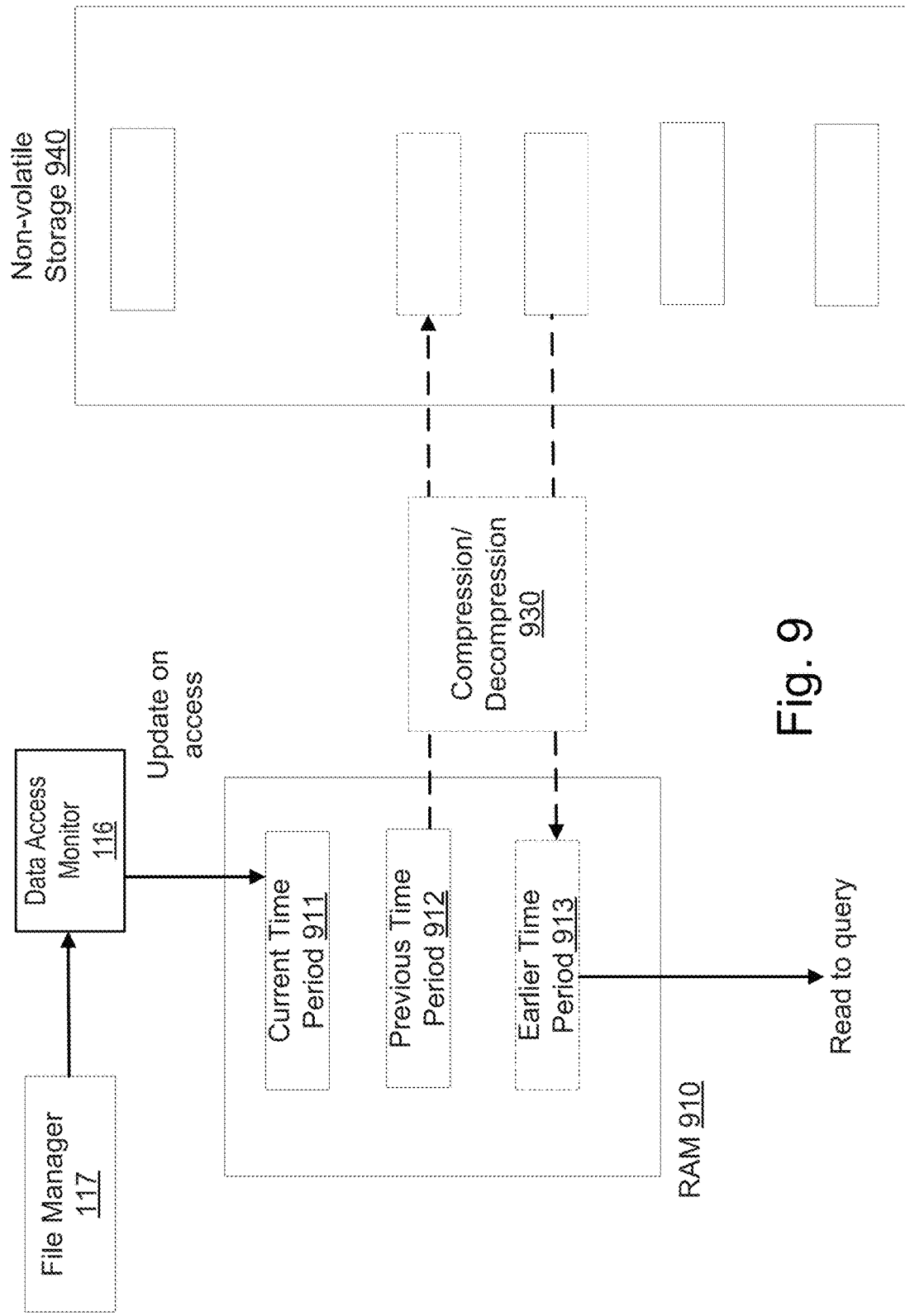
FIG. 9 is a block diagram that illustrates I/O access tracking, according to an embodiment of the invention.

FIG. 9 is a block diagram that illustrates I/O access tracking, according to an embodiment of the invention. File Manager 117 may request a block of storage to be read or written. In an embodiment, the request may comprise a file ID and byte offset into the file where access is to start. The request may also include an amount of data to access, such as a number of bytes. In an embodiment, the File Manager 117 may request to read 4K bytes of data starting at the specified byte offset. Data Access Monitor 116 may update a data structure stored in Random Access Memory (RAM) 910 to record the I/O access. For example, Current Time Period 911 represents a data structure in main memory for tracking I/O accesses in the current time period.

Data structures representing time periods other than the current time period may also reside in RAM. For example, Previous Time Period 912 may still be in memory or may be in the process of migrating to Non-Volatile Storage 940.

Earlier Time Period 913 data structure may be retrieved from non-volatile storage into main memory so that the cache manager may query whether a particular block was accessed during that earlier time period.

As MEDSs that are resident in RAM 910 are moved to Non-volatile Storage 940, the access data may be compressed by Compressor/Decompressor 930 to occupy less space in storage while not being used. "Compression" is used herein to mean any technique that reduces the space required to store data. FIG. 9 illustrates a MEDS labelled Earlier Time Period 913 being retrieved from Non-volatile Storage 940. If the data stored in Earlier Time Period 913 is stored in compressed form, then retrieving from storage includes decompressing the compressed data.

Figure 10:
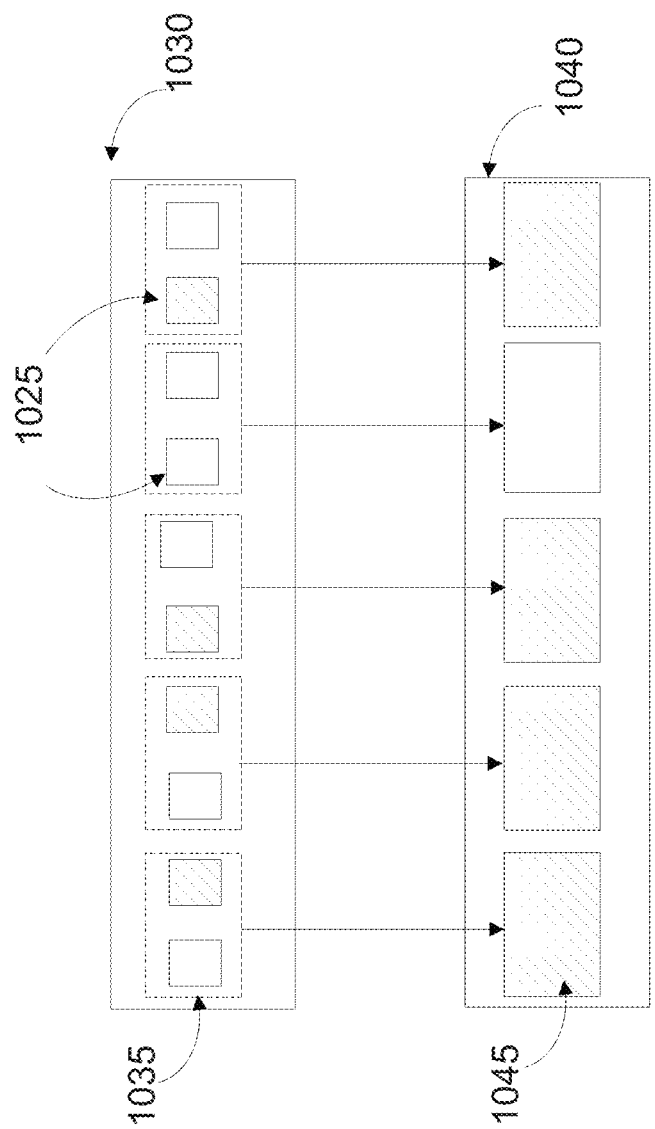
FIG. 10 is a diagram illustrating an aggregation compression technique, according to an embodiment of the invention.

In one embodiment, compressing the time period access data involves representing access for a coarser granularity; that is, larger block size. FIG. 10 is a diagram illustrating an aggregation compression technique, according to an embodiment of the invention. 1030 represents a bitmap of uncompressed time period access data. Each small square 1025 represents one bit in the map. Shaded boxes represent bits that are set and white boxes represent bits that are not set. 1040 represents a bitmap recording accesses for blocks that are twice the size as the blocks represented by a bit in 1030. Thus 1040 requires half the number of bits to represent access to the larger blocks. 1045 represents a bit in the 1040 bitmap. The dashed line rectangles, such as 1035, represent the aggregation process. Bits are grouped together and a function of the values of the bits enclosed within the same dashed rectangle may determine the aggregated value. For example, the values of the bits inside 1035 are used to determine the value of 1045. In the illustration, if either of the bits in 1035 is set, then the bit representing the aggregated value is also set. In an embodiment, contiguous bits in the bitmap are grouped, and the aggregated value for the larger block is set if either of the smaller storage blocks was accessed. For example, if each bit in 1030 represents a 4K block of storage, then each bit in 1040 may represent an 8K block of storage comprising the concatenation of the two contiguous 4K blocks.

In another embodiment, compression may be achieved by only storing access data for a subset of the entire address space. An index may be built that indicates for any particular portion of the address space whether and where within the compressed data structure resides that contains the access history for the particular portion of the address space. Portions of the address space that are very sparsely accessed may not have an access pattern stored. Standard compression algorithms such as Lempel Ziv or Huffman encoding may be used to compress the data structures.

Figure 11:
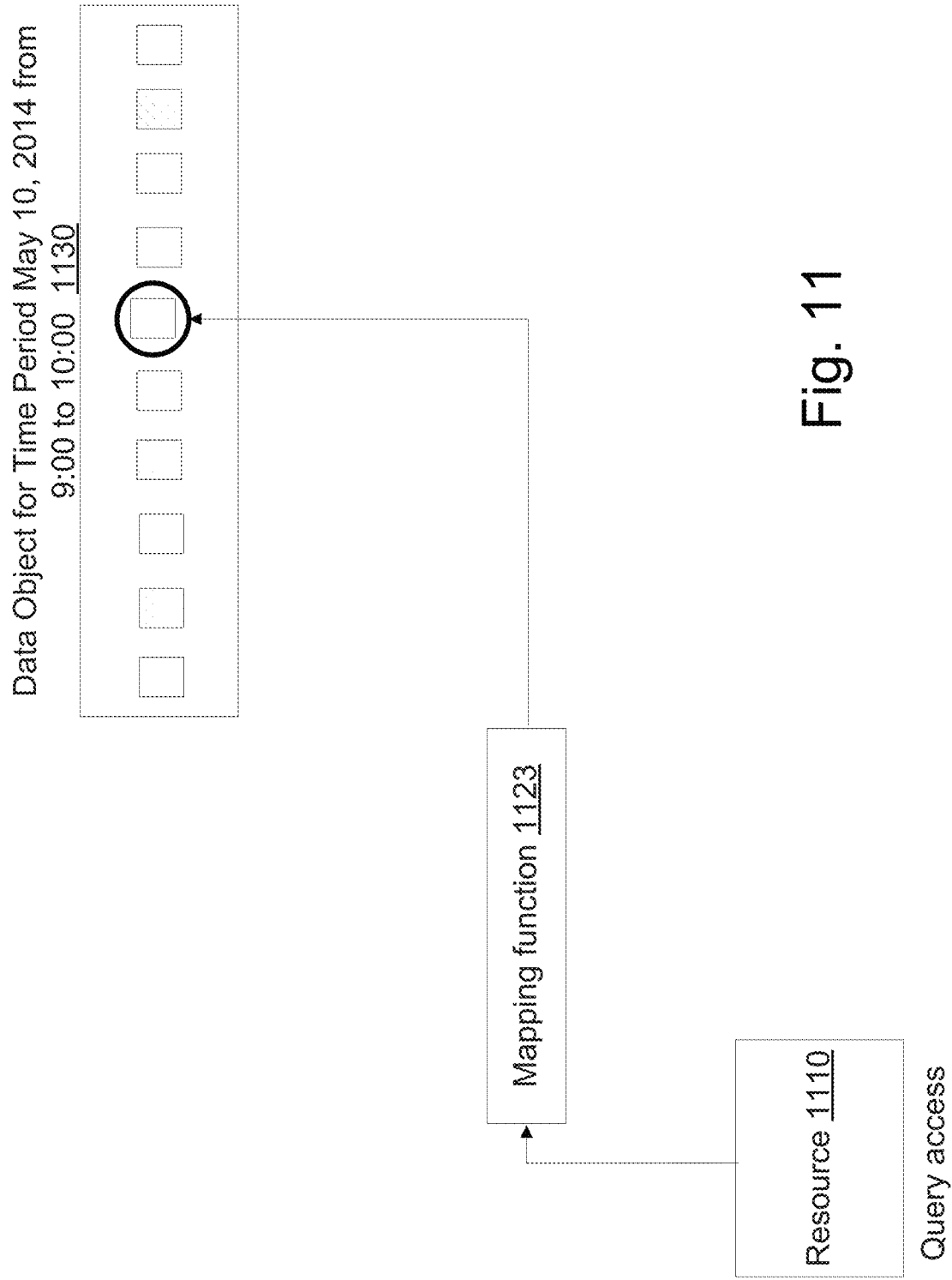
FIG. 11 is a diagram showing the representation of I/O access in a bitmap, according to an embodiment of the invention.

FIG. 11 is a diagram showing the representation of I/O access in a bitmap, according to an embodiment of the invention. In an embodiment, a bitmap representing accesses on May 20, 2014 between 9:00 am and 10:00 am comprises a bit for each block being tracked. Resource 1110 is a block being accessed, and Mapping function 1123 maps the identifier for Resource 1110 into a distinct bit in the bitmap. If and only if the bit is set at the mapped position, Resource 1110 was accessed. In another embodiment, a bitmap may represent a portion of a LUN instead of the entire LUN, or multiple bitmaps may be used to represent overlapping or non-overlapping regions of a LUN.

Figure 12:
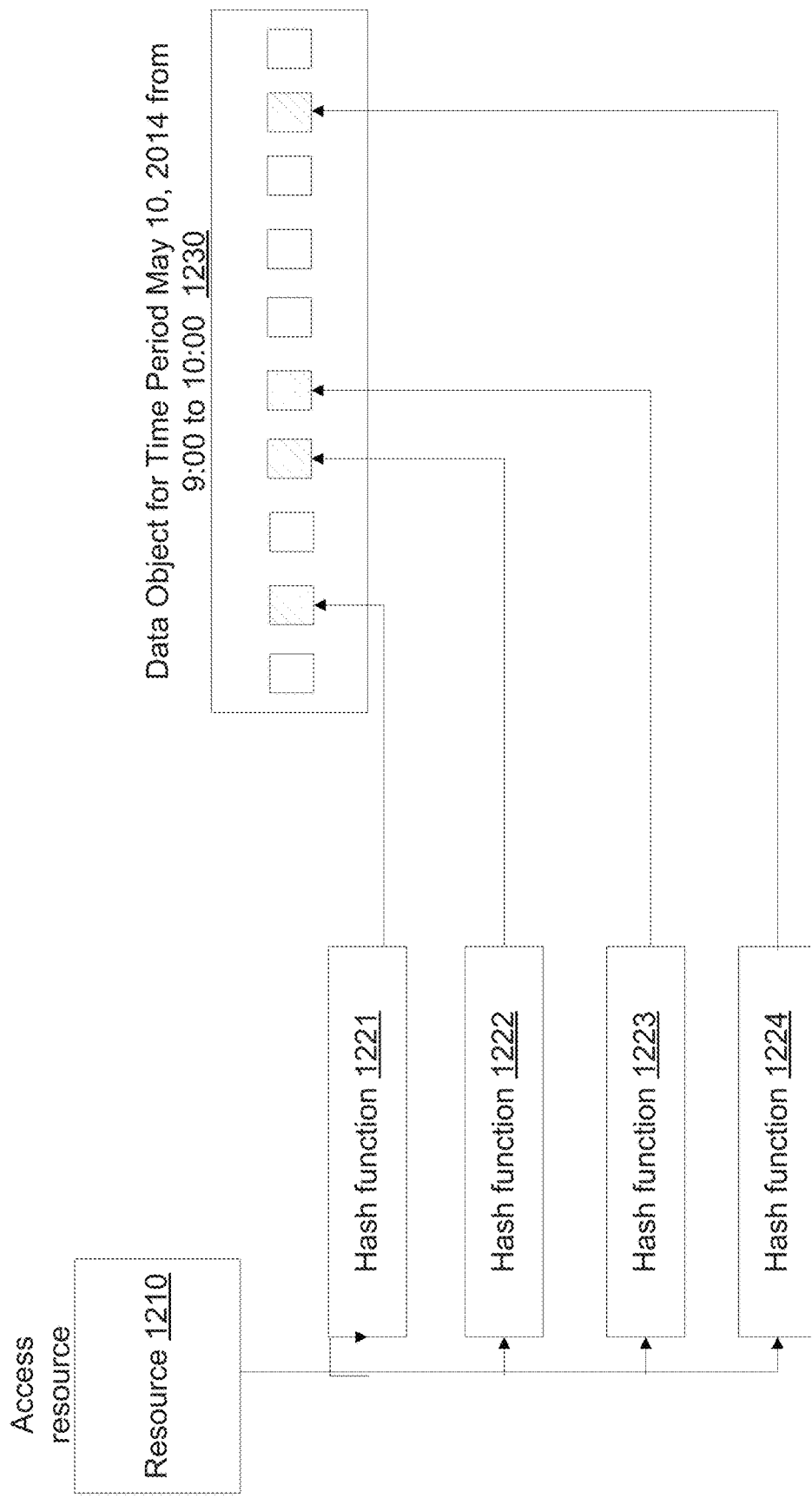
FIG. 12 is a diagram showing the storing of an I/O access in a bloom filter, according to an embodiment of the invention.
Figure 13:
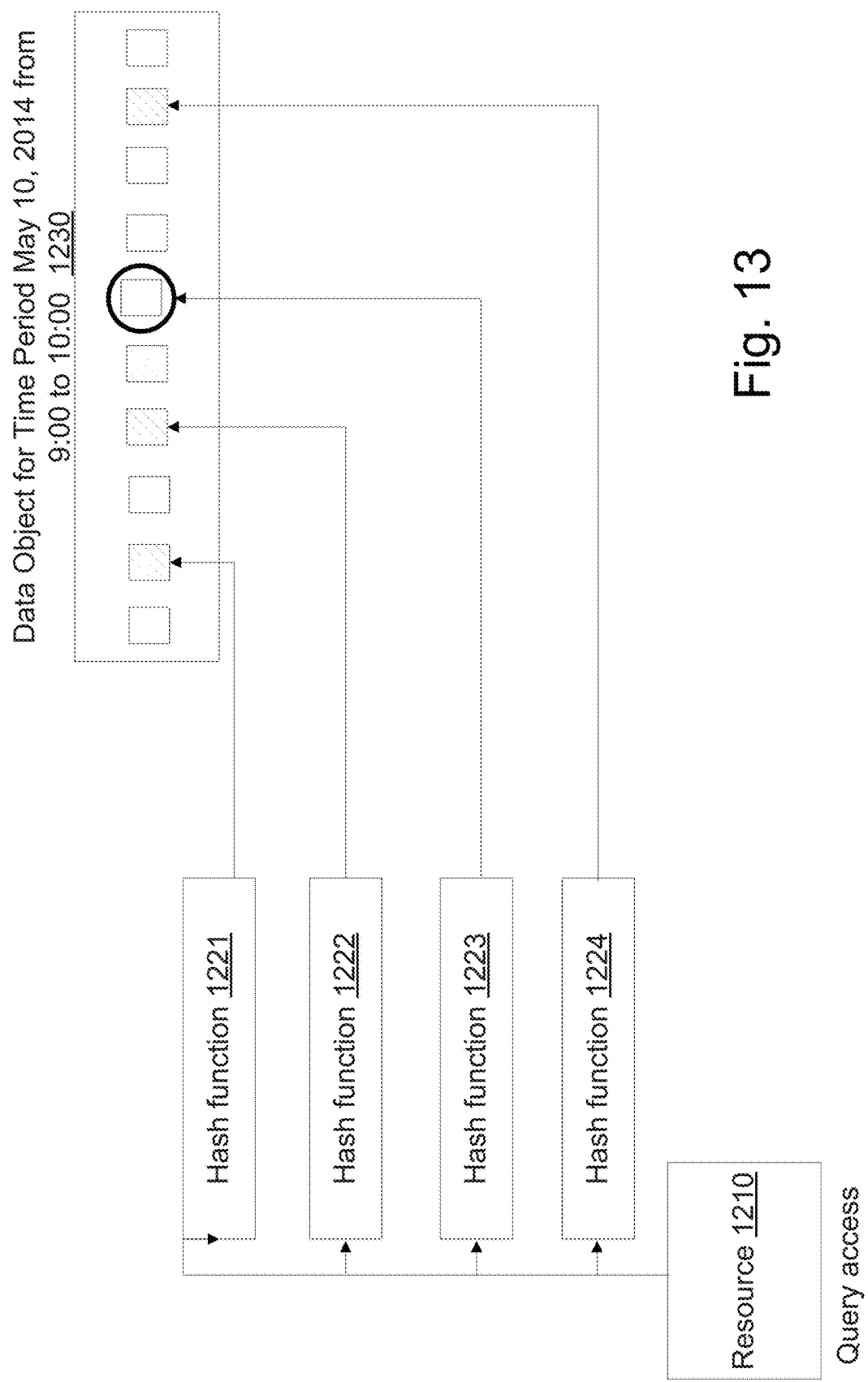
FIG. 13 is a diagram showing the determination of a previous I/O access in a bloom filter, according to an embodiment of the invention.

FIG. 12 is a diagram showing the storing of an I/O access in a bloom filter, according to an embodiment of the invention. A bloom filter is a space-efficient probabilistic data structure that is used to test whether an element is a member of a set. False positive matches are possible, but false negatives are not. A bloom filter is often implemented as a bit array of m bits, all initialized to 0. There must also be k different hash functions defined, each of which maps or hashes some set element to one of the m array positions with a uniform random distribution. The size of the bitmap representing accesses is smaller because in a bloom filter there is not a one-to-one correspondence between block identifier and bits representing access to the block. Instead, patterns of bits together identify access of a block. Hash functions 1221-1224 each map the same identifier for Resource 1210 to a distinct bit in the bitmap, forming a set of bits. To record an access, all bits in the set of bits are turned on. FIG. 13 is a diagram showing the determination of a previous I/O access in a bloom filter, according to an embodiment of the invention. To determine whether an access has occurred, the values of all bits in the set are inspected. Access has occurred if and only if all bits in the set are turned on. As illustrated, Hash function 1223 identifies the position of a bit that is not turned on. Thus, according to the example bloom filter, Resource 1210 has not been previously accessed. A person of ordinary skill in the art would recognize that inverse logic could alternatively be used. That is, all bits could be initialized as turned on and turning off bits could symbolize that access has occurred.

Figure 14:
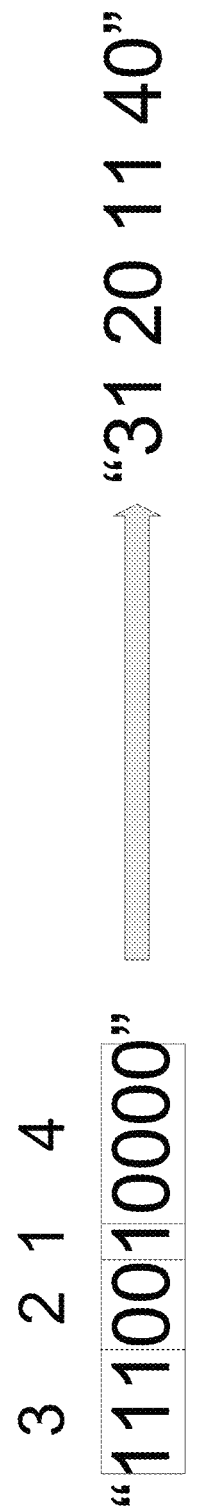
FIG. 14 is a diagram illustrating a run-length encoding compression technique, according to an embodiment of the invention.

FIG. 14 is a diagram illustrating a run-length encoding compression technique, according to an embodiment of the invention. The in-memory bitmap may be stored as a sequence of zeroes and ones. However, the length of the sequence may be shortened by storing the number of consecutive bits with the subsequent value. For example, "1110010000" may be rewritten as "31201140" (i.e., 3 ones, 2 zeroes, 1 one, and 4 zeroes). Given access locality, it is highly likely that contiguous blocks will either all be accessed or all not accessed. Thus, it is likely for a bit map of I/O accesses to have long sequences of "1"s and long sequences of "0"s.

Figure 15:
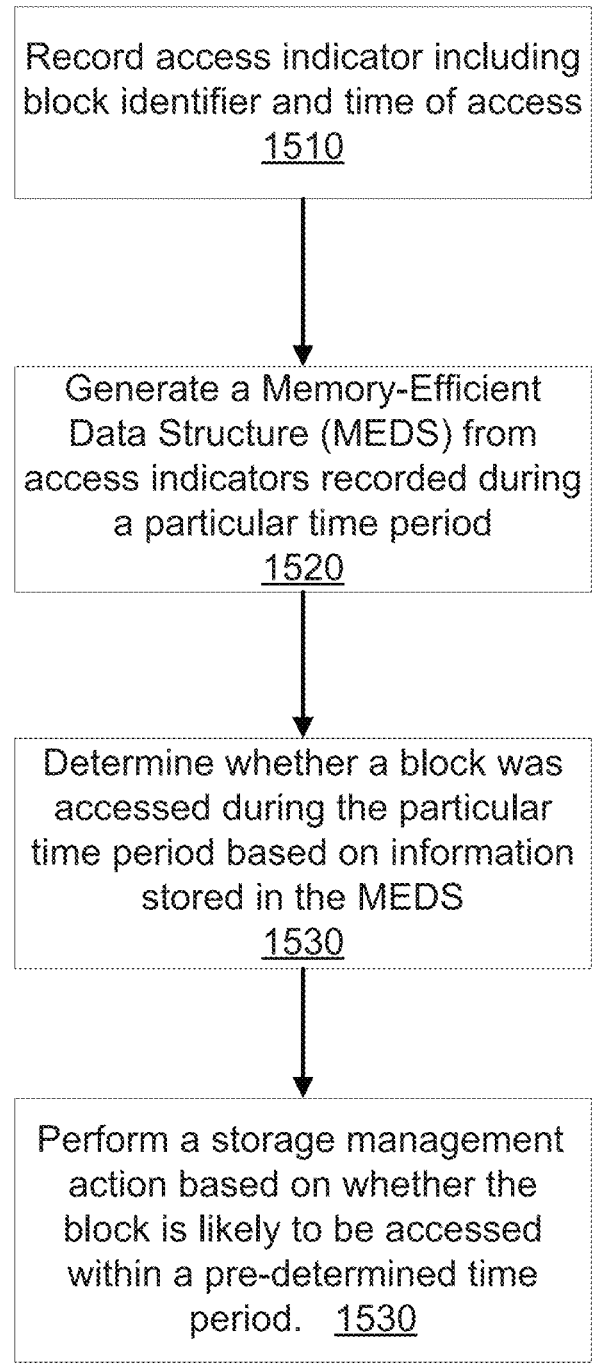
FIG. 15 is a flow diagram showing a process for recording I/O accesses, storing the access history in a Memory Efficient Data Structure, and using the recorded information to make storage management decisions

FIG. 15 is a flow diagram showing a processor for using a MEDS to inform storage management decisions, according to an embodiment of the invention. The process of the flow diagram is further illustrated in FIG. 16, which is a block diagram illustrating the interaction of components for recording I/O accesses in real time, storing access data in a MEDS, and using the MEDS for making intelligent storage management decisions. The method as shown in FIG. 15 may be performed by processing logic, which may include software, hardware, or a combination thereof.

The first portion of the flow is the recording and analysis of I/O accesses. File Manager 117 may access a block of storage. In Operation 1510, I/O accesses are recorded in an in-memory buffer, recording at least identification of the data blocks accessed and when they were accessed. Data Access Monitor 116 captures information about a data access such as the block identifier, and in real time, sets one or more bits at positions in the In-memory Bit map 1610 that are identified by applying one or more a mapping functions to the block identifier. The In-memory Bit map 1610 represents accesses during the current time period, so time of access is implicitly recorded as occurring during a time period, and a timestamp need not be stored for each access.

In an embodiment, once the time advances beyond the end boundaries of the period represented by the in-memory bit-map, a new bit-map representing a new time period may be created. In Operation 1520, Data Structure Generator 1620 may compress the data stored in In-memory Bit map 1610 and store the compressed data in a Memory Efficient Data Structure 1630.

Figure 16:
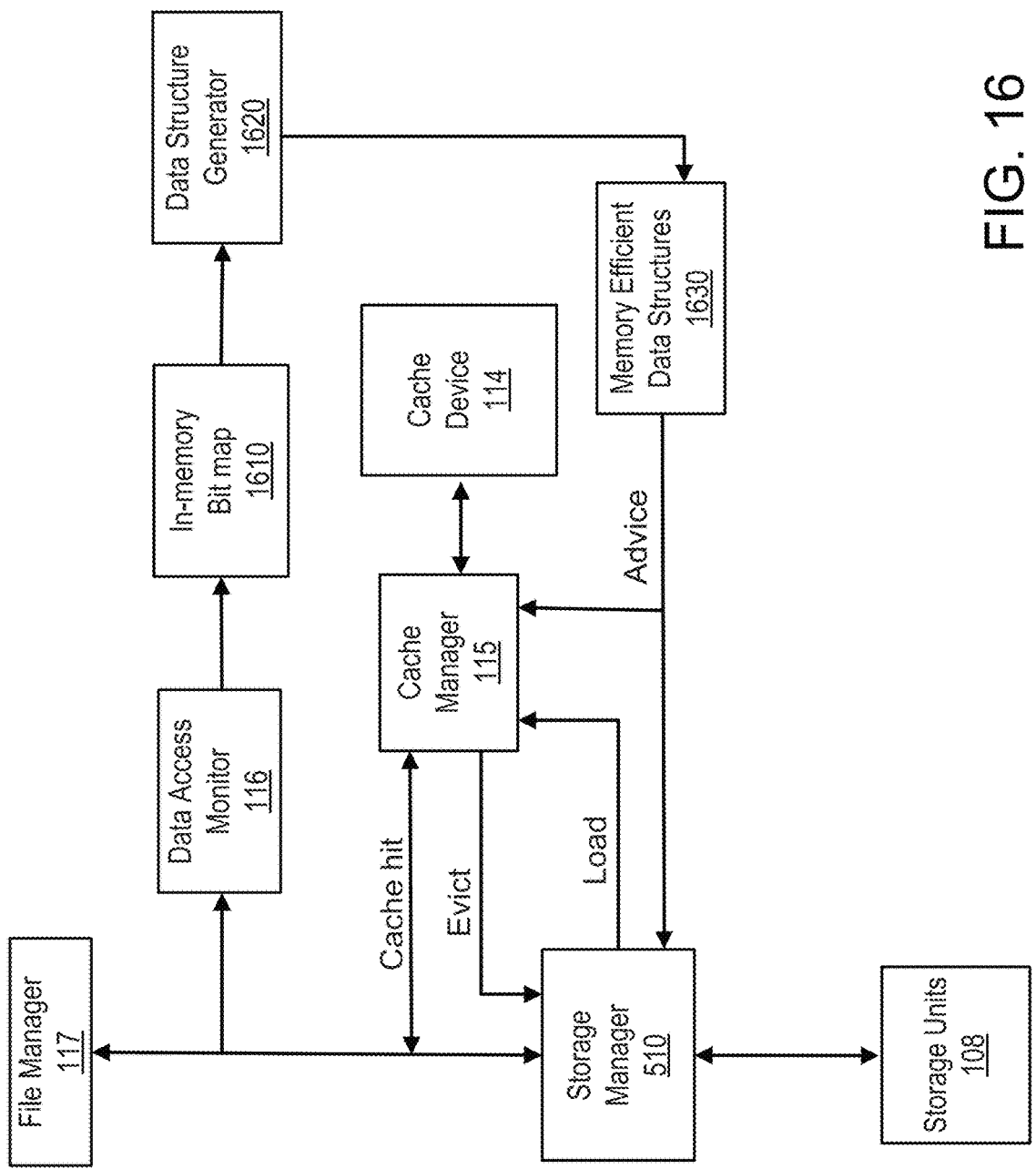
FIG. 16 is a block diagram illustrating the interaction of components for recording I/O accesses in real time, storing access data in a MEDS, and using the MEDS for making intelligent storage management decisions.

The second portion of the flow illustrated in FIG. 16 is the flow associated with responding to a request for information useful to optimize storage management decisions. Cache Manager 115 may determine whether the block requested by File Manager 117 is stored within Cache Device 114. If so, the cached block may be accessed according to the request. If the requested block is not currently cached, then Storage Manager 510 may retrieve the requested block from Storage Units 108. The Storage Manager 510 may load the requested block into the cache. Cache Manager 115, upon receiving a new block to cache, may be required to evict a block currently in the cache to make room for the new block.

In Operation 1530, the set of MEDSs may be inspected to determine whether the block selected for eviction is likely to be accessed again within a predetermined time period. For example, the cache manager could determine from the MEDS representing the previous time period whether the selected block was accessed within the last time period. Another example is that the Cache Manager 115 could determine whether the selected block was accessed during the current time of day on previous several days or in past weeks on the same day of the week as the current day. If there is an indication that the selected block is likely to be accessed again soon, the Cache Manager 115 may select another block for eviction. Such patterns may be determined from the MEDS and recorded in an auxiliary structure as well.

In an embodiment, an offline process such as a pattern analyzer could analyze the MEDS across time periods and detect patterns to insert into an access heuristics database to support future access pattern queries.

In an embodiment, the Storage Manager 510 may consult the MEDSs before requesting to load a newly access block into the cache. Storage Manager 510 may further consult the MEDS to determine whether to pre-fetch additional blocks or to determine in which tier of storage to store a block of data based on the expected next time of access.

Figure 17:
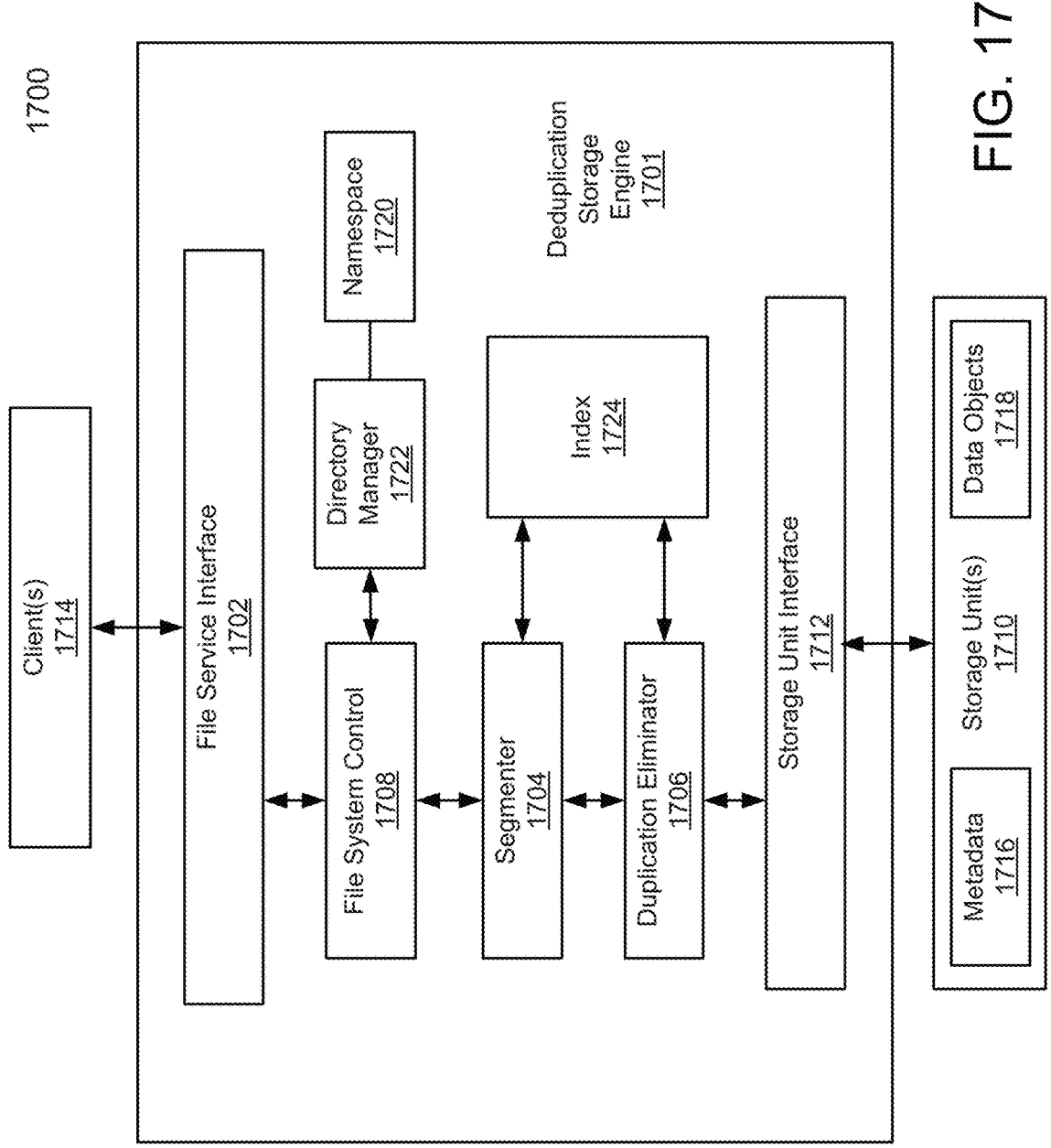
FIG. 17 is a block diagram illustrating a deduplicated storage system according to one embodiment of the invention.

FIG. 17 is a block diagram illustrating a deduplication storage system according to one embodiment of the invention. For example, deduplication storage system 1700 may be implemented as part of a deduplication storage system as described above, such as, for example, the deduplication storage system as a client and/or a server as shown in FIG. 1. In one embodiment, storage system 1000 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1700 may have a distributed architecture, or all of its components may be integrated into a single unit. Storage system 1700 may be implemented as part of an archive and/or backup system such as a deduplicating storage system available from EMC® Corporation of Hopkinton, Mass.

In one embodiment, storage system 1700 includes a deduplication engine 1701 interfacing one or more clients 1714 with one or more storage units 1710 storing metadata 1716 and data objects 1718. Clients 1714 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1710 may be implemented locally (e.g., single node operating environment) or remotely (e.g., multi-node operating environment) via an interconnect, which may be a bus and/or a network (e.g., a storage network). In one embodiment, one of storage units 1710 operates as an active storage to receive and store external or fresh user data from a client (e.g., an end-user client or a primary storage system associated with one or more end-user clients), while the another one of storage units 1710 operates as a target storage unit to periodically archive data from the active storage unit according to an archiving policy or scheme. Storage units 1710 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1710 may also be combinations of such devices. In the case of disk storage media, the storage units 1710 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1716, may be stored in at least some of storage units 1710, such that files can be accessed independent of another storage unit. Metadata of each storage unit includes enough information to provide access to the files it contains. In one embodiment, metadata may include fingerprints contained within data objects 1718, where a data object may represent a data chunk, a compression region (CR) of one or more data chunks, or a container of one or more CRs. Fingerprints are mapped to a particular data object via metadata 1716, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1716 may include a file name, a storage unit identifier (ID) identifying a storage unit in which the chunks associated with the file name are stored, reconstruction information for the file using the chunks, and any other appropriate metadata information. Metadata 1716 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk (also referred to as a data segment), one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1701 includes file service interface 1702, segmenter 1704 (also referred to as a chunking module or unit), duplicate eliminator 1706, file system control 1708, and storage unit interface 1712. Deduplication storage engine 1701 receives a file or files (or data item(s)) via file service interface 1702, which may be part of a file system namespace 1720 of a file system associated with the deduplication storage engine 1701. The file system namespace 1720 refers to the way files are identified and organized in the system. An example is to organize the files hierarchically into directories or folders, which may be managed by directory manager 1722. File service interface 1712 supports a variety of protocols, including a network file system (NFS), a common Internet file system (CIFS), and a virtual tape library interface (VTL), etc.

The file(s) is/are processed by segmenter 1704 and file system control 1708. Segmenter 1704, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based, such as, for example, a hash function is applied to values of data within a sliding window through the data stream or block and when the hash function is equal to a value (or equal to one of several values) then a chunk boundary is identified. In various embodiments, chunk boundaries are identified using content based functions operating on a sliding window within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, a chunk boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 1708, also referred to as a file system manager, processes information to indicate the chunk(s) association with a file. In some embodiments, a list of fingerprints is used to indicate chunk(s) associated with a file. File system control 1708 passes chunk association information (e.g., representative data such as a fingerprint) to index 1724. Index 1724 is used to locate stored chunks in storage units 1710 via storage unit interface 1712. Duplicate eliminator 1706, also referred to as a segment store, identifies whether a newly received chunk has already been stored in storage units 1710. In the event that a chunk has already been stored in storage unit(s), a reference to the previously stored chunk is stored, for example, in a chunk or segment tree associated with the file, instead of storing the newly received chunk. A chunk or segment tree of a file may include one or more nodes and each node represents or references one of the deduplicated chunks stored in storage units 1710 that make up the file. Chunks are then packed by a container manager (which may be implemented as part of storage unit interface 1712) into one or more storage containers stored in storage units 1710. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 1702 is configured to communicate with file system control 1708 to identify appropriate chunks stored in storage units 1710 via storage unit interface 1712. Storage unit interface 1712 may be implemented as part of a container manager. File system control 1708 communicates (e.g., via segmenter 1704) with index 1724 to locate appropriate chunks stored in storage units via storage unit interface 1712. Appropriate chunks are retrieved from the associated containers via the container manager and are used to construct the requested file. The file is provided via interface 1702 in response to the request. In one embodiment, file system control 1708 utilizes a tree (e.g., a chunk tree obtained from namespace 1720) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1701 may be implemented in software (e.g., executable code executed in a memory by a processor), hardware (e.g., processor(s)), or a combination thereof. For example, deduplication engine 1701 may be implemented in a form of executable instructions that can be stored in a machine-readable storage medium, where the instructions can be executed in a memory by a processor.

In one embodiment, storage system 1700 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining access patterns of data stored in a data processing system, the method comprising:

responsive to receiving a request to access a first data block, recording in a first memory device an access indicator that indicates a first identifier, of the first data block, in association with a time period at which the first data block was accessed, wherein the access indicator is a bloom filter, and a plurality of functions of an identifier of a particular data block are used to identify a corresponding plurality of bit positions in an access bitmap, a value of each bit at the plurality of bit positions together indicating access of the particular data block;

generating a memory-efficient data structure (MEDS) based on a plurality of access indicators recorded in the first memory device, representing an access pattern corresponding to the time period during which the first data block was accessed;

compressing access information from the plurality of access indicators, wherein the MEDS occupies less storage space on a second memory device as compared to an amount of storage space that the plurality of access indicators occupy on the first memory device;

subsequently in response to a request for accessing a second data block, uncompressing the access information stored in the MEDS before applying a query function to a second identifier of the second data block, wherein the query function returns a value based on data stored in the MEDS to indicate whether the second data block is associated with an access pattern represented by the MEDS; and Performing a storage management action based on the value returned by the query function, the storage management action including pre-fetching a data block, caching a data block, or evicting a data block, depending on the value returned by the query function.

2. The method of claim 1, wherein generating the MEDS representing a particular access time period is performed offline.

3. The method of claim 1, wherein the access indicator is the access bitmap.

4. The method of claim 3, wherein: each bit in the access bitmap indicates access of the particular data block, the particular data block occupying a particular size in the first memory device.

5. The method of claim 1, wherein: each access indicator indicates access of a data block of a first particular size; and the MEDS includes a plurality of data elements, each data element having a value that indicates access of a data block of a second particular size; and the second particular size is larger than the first particular size.

6. The method of claim 1, further comprising: selecting one or more sets of data blocks, wherein each set of data blocks comprises a plurality of data blocks, wherein generating the memory-efficient data structure (MEDS) is performed based on access indicators indicating access of the selected one or more sets of data blocks, and wherein the MEDS does not include an indication of access for at least one data block that has an access indicator stored in the first memory device.

7. The method of claim 1, wherein the MEDS is stored to a second memory device different than the first memory device comprising non-volatile storage and can be queried at a future time.

8. The method of claim 7, wherein the non-volatile storage is a database.

9. The method of claim 1, wherein the first memory device is a volatile random access memory device.

10. A non-transitory computer-readable storage medium storing instructions for determining access patterns of data stored in a data processing system, the instructions that when executed by one or more processors, cause the one or more processors to:

record, responsive to receipt of a request to access a first data block, in a first memory device an access indicator that indicates a first identifier, of the first data block, in association with a time period at which the first data block was accessed, wherein the access indicator is a bloom filter, and a plurality of functions of an identifier of a particular data block are used to identify a corresponding plurality of bit positions in an access bitmap, a value of each bit at the plurality of bit positions together indicating access of the particular data block;

generate a memory-efficient data structure (MEDS) based on a plurality of access indicators recorded in the first memory device, the MEDS representing an access pattern corresponding to the time period during which the first data block was accessed;

compress access information from the plurality of access indicators, wherein the MEDS occupies less storage space on a second memory device as compared to an amount of storage space that the plurality of access indicators occupy on the first memory device;

uncompress the access information stored in the MEDS before apply a query function, in response to a request for access to a second data block, to a second identifier of the second data block, wherein the query function returns based on data stored in the MEDS, an indication of whether the second data block was accessed during the time period associated with the MEDS; and Perform a storage management action based on the indication returned by the query function, the storage management action including pre-fetching a data block, caching a data block, or evicting a data block, depending on the value returned by the query function.

11. The non-transitory computer-readable storage medium of claim 10, wherein the MEDS representing a particular access time period is generated offline.

12. The non-transitory computer-readable storage medium of claim 10, wherein the access indicator is the access bitmap.

13. The non-transitory computer-readable storage medium of claim 12, wherein: each bit in the access bitmap indicates access of the particular data block, the particular data block occupies a particular size in the first memory device.

14. The non-transitory computer-readable storage medium of claim 10, wherein: each access indicator indicates access of a data block of a first particular size; and the MEDS includes a plurality of data elements, each data element having a value that indicates access of a data block of a second particular size; and the second particular size is larger than the first particular size.

15. The non-transitory computer-readable storage medium of claim 10, the instructions further cause the one or more processors to: select one or more sets of data blocks, wherein each set of data blocks comprises a plurality of data blocks, wherein generation of the memory-efficient data structure (MEDS) is performed based on access indicators that indicate access of the selected one or more sets of data blocks, and wherein the MEDS does not include an indication of access for at least one data block that has an access indicator stored in the first memory device.

16. The non-transitory computer-readable storage medium of claim 10, wherein the MEDS is stored to a second memory device different than the first memory device comprising non-volatile storage and can be queried at a future time.

* * * * *